US012753373B2

(12) United States Patent
Dassey et al.

(10) Patent No.: US 12,753,373 B2
(45) Date of Patent: Oct. 6, 2026

(54) SYSTEM AND METHOD FOR IMPURITY REMOVAL FROM CARGO TANKS OF VESSELS THAT STORE AND TRANSPORT HYDROCARBONS

(71) Applicant: Chevron U.S.A. Inc., San Ramon, CA (US)

(72) Inventors: Adam James Dassey, Houston, TX (US); Manoj Ramachandran, Houston, TX (US); Shaik Mohammed Mushtaq, Houston, TX (US); Thomas Peter Hoelen, Berkeley, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 384 days.

(21) Appl. No.: 18/548,903

(22) PCT Filed: Mar. 3, 2022

(86) PCT No.: PCT/US2022/018809
§ 371 (c)(1),
(2) Date: Sep. 3, 2023

(87) PCT Pub. No.: WO2022/187562
PCT Pub. Date: Sep. 9, 2022

(65) Prior Publication Data
US 2024/0141262 A1 May 2, 2024

Related U.S. Application Data

(60) Provisional application No. 63/155,810, filed on Mar. 3, 2021.

(51) Int. Cl.
*C11D 3/04* (2006.01)
*B63B 57/02* (2006.01)
(Continued)

(52) U.S. Cl.
CPC ................ *C11D 7/08* (2013.01); *B63B 57/02* (2013.01); *C11D 1/66* (2013.01); *C11D 3/0073* (2013.01);
(Continued)

(58) Field of Classification Search
CPC .. C11D 1/66; C11D 3/34; C11D 3/042; C11D 3/044; C11D 2111/20
(Continued)

(56) References Cited

U.S. PATENT DOCUMENTS 5,273,591 A * 12/1993 Perkins .................. B63B 57/02 134/36
2003/0109394 A1* 6/2003 Ruhr .................... C11D 3/3784 510/202
(Continued)

FOREIGN PATENT DOCUMENTS

CN 105820882 A 8/2016
GB 1433487 A 4/1976
(Continued)

OTHER PUBLICATIONS

PCT International Search Report mailed on Aug. 11, 2022, issued in International Application No. PCT/US22/018809, filed on Mar. 3, 2022, 23 pages.

*Primary Examiner* — Gregory R Delcotto
(74) *Attorney, Agent, or Firm* — Jason M. Guerrero

(57) ABSTRACT

A process to remove impurities from a surface of a cargo tank of a vessel used to transport liquid hydrocarbons includes using an active chemical solution to dissolve at least a portion of the impurities or the matrix in which they are embedded deposited on the surface of the cargo tank. The process also includes allowing the active chemical solution to subsequently remove embedded impurities from the surface.

14 Claims, 9 Drawing Sheets

(51) Int. Cl.

| | |
|---|---|
| ***C11D 1/66*** | (2006.01) |
| ***C11D 3/00*** | (2006.01) |
| ***C11D 3/10*** | (2006.01) |
| ***C11D 3/34*** | (2006.01) |
| ***C11D 7/08*** | (2006.01) |

(52) U.S. Cl.
CPC .............. *C11D 3/042* (2013.01); *C11D 3/044* (2013.01); *C11D 3/34* (2013.01); *C11D 2111/16* (2024.01); *C11D 2111/42* (2024.01)

(58) Field of Classification Search
USPC ......................... 510/234, 247, 269, 492, 421
See application file for complete search history.

(56) References Cited

U.S. PATENT DOCUMENTS

2022/0372398 A1* 11/2022 Weissenberger ..... C11D 3/0026
2022/0396751 A1* 12/2022 Soontravanich ....... C11D 3/042

FOREIGN PATENT DOCUMENTS

WO WO-2012028203 A1 * 3/2012 ............... C11D 7/36
WO WO-2017182305 A1 * 10/2017 ......... C11D 17/0043
WO 2019198007 A1 10/2019
WO WO-2019204715 A1 * 10/2019 ............. C11D 3/381

* cited by examiner

SYSTEM AND METHOD FOR IMPURITY REMOVAL FROM CARGO TANKS OF VESSELS THAT STORE AND TRANSPORT HYDROCARBONS

FIELD

The present disclosure relates to systems and methods for decontaminating or decommissioning large tanks or vessels including cargo tanks of nautical vessels that store and transport hydrocarbons.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Crude oil and gas in reservoirs can contain trace levels of impurities, such as inorganic compounds including nickel, vanadium, mercury, arsenic, manganese, tungsten, and selenium, as well as Naturally Occurring Radioactive Matter (NORM). In particular, heavy metals such as mercury can be present in trace amounts in all types of produced fluids such as hydrocarbon gases, crude oils, and produced water. The amount can range from below the analytical detection limit to several thousand ppbw (parts per billion by weight) depending on the source Storage, processing, or transport of reservoir fluids by nautical vessels can result in deposition of these impurities on internal surfaces.

When nautical vessels that store and transport liquid hydrocarbons reach the end of their service life, they undergo a standard "demucking" process to remove residual hydrocarbons, waxes, and solids from the cargo tanks. Occasionally these vessels store and transport hydrocarbons that contain impurities that eventually embed within the corrosion material, scale deposits, or a hydrocarbon layer on the vessel walls. These impurities can be undesirable and may require removal before final decommissioning of the vessel.

Removing these impurities typically requires additional steps that involve personnel entering the vessel to clean the walls by hand or high-pressure water jetting. These methods have a variety of shortcomings that can make them unsafe, impractical, time and energy intensive and/or cost prohibitive. It would be desirable to have an improved method for removing these impurities from vessels in an energy-efficient, faster and more effective manner compared to conventional methods.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure include a process to remove impurities from a surface of a cargo tank of a vessel used to store and transport liquid hydrocarbons. The process includes using an active chemical solution to mobilize at least a portion of the impurities deposited on the surface of the cargo tank into the active chemical solution, and allowing the active chemical solution to subsequently remove embedded impurities from the surface.

BRIEF DESCRIPTION OF THE DRAWINGS

These and other objects, features and advantages of the present disclosure will become better understood with reference to the following description, appended claims and accompanying drawings, wherein:

DETAILED DESCRIPTION

As set forth above, it is now recognized that it would be desirable to have an improved method for removing impurities from vessels in an energy-efficient, faster and more effective manner compared to conventional methods. In accordance with embodiments of this disclosure, a process uses targeted chemicals to dissolve all or a portion of the surface deposits on the vessel walls, which subsequently removes the embedded impurities.

Figure 1:
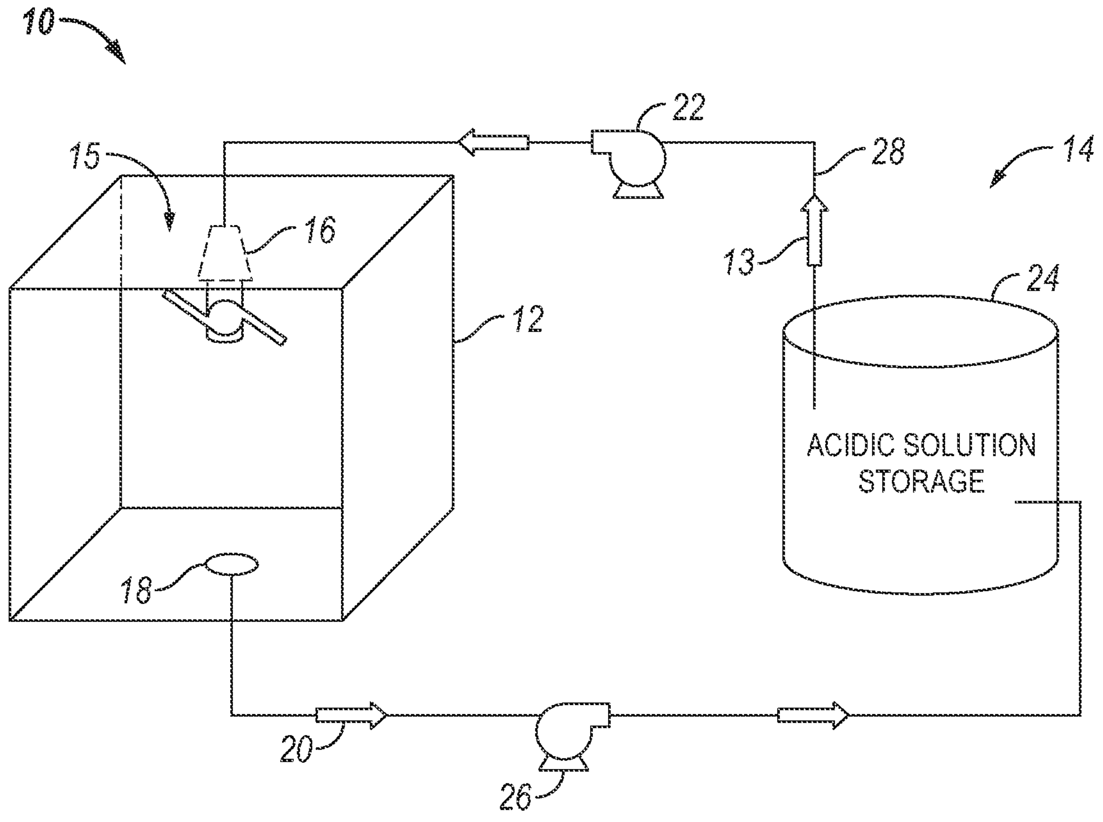
FIG. 1 is a schematic diagram of a crude oil wash (COW) tank cleaning machine repurposed to spray acid around a cargo tank, in accordance with an embodiment of this disclosure.

The approaches described herein may be applied to different systems and vessel types, such as nautical, offshore, and onshore vessels. An example of a system 10 to remove materials of potential concern (MOPCs) from a cargo tank 12 is illustrated in FIG. 1. As shown in the example embodiment of FIG. 1, the system 10 includes a cargo tank 12, for example a cargo tank 12 of a nautical vessel that is used to store and transport hydrocarbons. The system 10 also includes a series of fixed or portable tank cleaning machines, also known as a crude oil wash (COW 14), which typically sprays heated crude or seawater on the tank ceilings, walls, and bottoms, to remove hydrocarbon deposits such as waxes and paraffins.

In accordance with embodiments of this disclosure, the COW 14 may be used to circulate an active chemical solution 13 (e.g., an acidic solution or a caustic solution) through the cargo tank 12 to facilitate removal of MOPCs. In such embodiments, the reconfigured or repurposed COW 14 may be referred to as all or a part of an impurity removal system (system 10).

In the illustrated embodiment, the impurity removal system 10 includes an inlet assembly having one or more spray apparatus 16 (e.g., nozzles or jets) to introduce the active chemical solution 13, in this embodiment the acidic solution (e.g., an inlet solution, a first acidic solution) into the cargo tank 12. One or more cargo tank outlets 18 allow an effluent solution 20 (e.g., a solution having dissolved MOPCs and acid, a second acidic solution) to be removed from the cargo tank 12. A portable inlet pump 22 or cargo tank pump motivates the acidic solution at an appropriate pressure to at least one spray apparatus 16 from an acid storage 24 (e.g., a source of acid such as an acid storage tank or slop tank), while an outlet pump 26 motivates the effluent solution 20 out of the cargo tank 12 and back toward the acid storage.

In certain embodiments, to produce the impurity removal system 10, the COW 14 may be retrofit or reconfigured with materials that are able to withstand the acidity of the acidic solution. For example, any one or a combination of the inlet assembly 15 (e.g., spray apparatus 16), inlet and outlet lines to and from the cargo tank 12, and the inlet and outlet pumps 22, 26, may be coated or replaced with materials that are corrosion-resistant. Such corrosion-resistance may be dependent on the nature of the acidic solution to be used to wash the cargo tank 12. Additionally or alternatively, the COW 14 may be retrofit or reconfigured with different types or numbers of nozzles, jets, scrubbers, or other spray apparatus, to produce the impurity removal system 10.

The spray apparatus 16, in certain embodiments, may be configured to operate at different heights (e.g., be height-adjustable), and may be operated for at least one full wash cycle at each adjustable height. An individual spray apparatus, for instance, may have a certain number of height adjustments (e.g., four or more) height adjustments to achieve maximum coverage of the tank 12. In still further embodiments, corrosion inhibitors added to the acid solution may be used to allow the components of the COW to withstand the acidic solution and minimize reaction of acid with uncorroded steel after surface materials are removed To facilitate removal of MOPCs from the cargo tank 12, the impurity removal system 10 may be configured to remove the MOPCs physically and/or chemically. For example, the impurity removal system 10 may facilitate physical removal of the MOPCs by jetting the acidic solution at a sufficient pressure such that at least some of the material is mechanically removed from surfaces of the cargo tank 12. Indeed, the combination of the pump configuration (e.g., of pumps 22, 26) and spray apparatus 16 (e.g., nozzle/jet) configuration may result in predetermined inlet pressures to facilitate this process.

The acidic solution facilitates at least partial dissolution (e.g., partial dissolution, total dissolution, a mixture of dissolution and suspension) of the MOPCs or the matrix in which the MOPCs are embedded, for example physically and chemically. In certain embodiments the acid of the acidic solution reacts with the MOPCs to form salts (e.g., salts that are more easily dissolved in aqueous solutions).

In one approach, the acidic solution is a high strength acidic solution (e.g., containing >5% v/v (by volume) acid such as hydrochloric, sulfuric, nitric, phosphoric, hydrofluoric, ammonium bifluoric acid, organic acids, or a mixture thereof). The acidic solution is circulated through the system 10. The acidic solution streams down the walls of the cargo tank 12, dissolving all or a portion of the corrosion material and impurities (e.g., MOPCs). The force of the spray apparatus 16 (e.g., jets) enhances solids removal from the inner tank surfaces that have been destabilized by contact with the acid. The acid collects at the bottom of the tank 12 and is then pumped to the acid storage tank 24 or slop tank where it can be filtered and re-sprayed by the cleaning machine against the tank walls. In certain embodiments, the filtration may be performed within the acid storage tank 12. Additionally or alternatively, filtration may be performed outside of the acid storage tank 12. The process continues until the impurities have been reduced to the desired level. Effluent samples can be collected at regular intervals to monitor the effectiveness of the acid. The samples can be measured for remaining acid strength, total or dissolved iron, and the impurity concentration. If needed, fresh acid can be added or (some of the) spent acid can be replaced with fresh acid during the process.

In certain embodiments, the desired acidity of the acidic solution may be achieved by dilution with purified water, seawater, and/or wastewater, which may include deionized water, tap water, surface water, groundwater, ballast water, and/or produced water from oil and gas production. Thus, the impurity removal system 10 may include one or more sources of acid, one or more sources of water, as well as equipment configured to facilitate appropriate mixing and circulation of such materials through the system 10.

In still further embodiments the impurity removal system 10 may include one or more heaters (not shown) to heat the acidic solution to a desired temperature to facilitate removal of the MOPCs. One or more heaters may be positioned, for example, along a feed line 28 between the acid storage tank 24 and the cargo tank 12. By way of non-limiting example, the acidic solution may be heated to a temperature below 100° C., for example by an in-line heater, to increase the effectiveness of the solution through acceleration of reaction rates or increased dissolution of salts.

The impurity removal system 10 may also include other material sources to facilitate impurity removal and/or to facilitate repurposing of the COW 14 for use as the impurity removal system 10. In certain embodiments, for instance, the acidic solution may include additional formulation components such as corrosion inhibitors, sulfide scavengers, and so forth.

By way of non-limiting example, in certain embodiments the acidic solution may be amended with an acid tolerant corrosion inhibitor (e.g., up to 5% v/v) to prevent excessive corrosion in the COW 14 (such as pumps, filter housings, jets, and piping) and minimize reactions of the acidic solution with uncorroded steel. As another example, the acidic solution may additionally or alternatively be amended with an acid tolerant sulfide scavenger such as glycol (e.g., up to 5% v/v) to prevent accumulation of dissolved and gaseous sulfides.

Present embodiments also include situations in which the cargo tank 12 is soaked using the impurity removal system 10. In a second approach, an acidic solution (e.g., containing acids such as hydrochloric, sulfuric, nitric, phosphoric, hydrofluoric, ammonium bifluoric acid, organic acids, or a mixture thereof) is diluted. The dilution may be to an aqueous concentration that is less than 5% v/v, for example.

In such embodiments, the diluted acidic solution is used to fill the cargo tank 12 up to a desired height. The tank 12 is soaked in the dilute acid solution for an extended time period, which may range from hours to weeks. The corrosion material and impurities dissolve or flake off as intact solids into the acid solution, which is then flushed out after the soaking period. In certain embodiments, certain features of the impurity removal system 10 (e.g., jets, impellers) may be used to agitate the solution to facilitate impurity removal from surfaces of the tank 12.

In addition to or as an alternative to using an aqueous solution that is circulated through the cargo tank 12, certain embodiments may apply the active chemical solution 13 (e.g., acidic solution) as a foam. In such embodiments, the impurity removal system 10 may include a source of a foaming agent, surfactant, or the like, along with the appropriate equipment for producing a foam and introducing the same into the cargo tank 12. For example, in one approach, a high strength acidic solution (e.g., >5% v/v acid) is applied as a dense acid foam to the interior of the cargo tank 12. The dense acid foam may be created, for example, by blending the acidic solution with specialty chemicals such as acid tolerant surfactants and foamers in combination with agitation (e.g., by the use of a COW 14 system). The foam is used to fill the cargo tank 12 and remains in contact with the tank walls until the desired level of treatment has been achieved and/or the foam collapses. The corrosion material and impurities dissolve or flake off as intact solids into the foamed acid which is then flushed out after the contact period. The residuals may be flushed using, for example, another acidic solution, water, a caustic solution, a buffer solution, or any combination of solutions.

Figure 2:
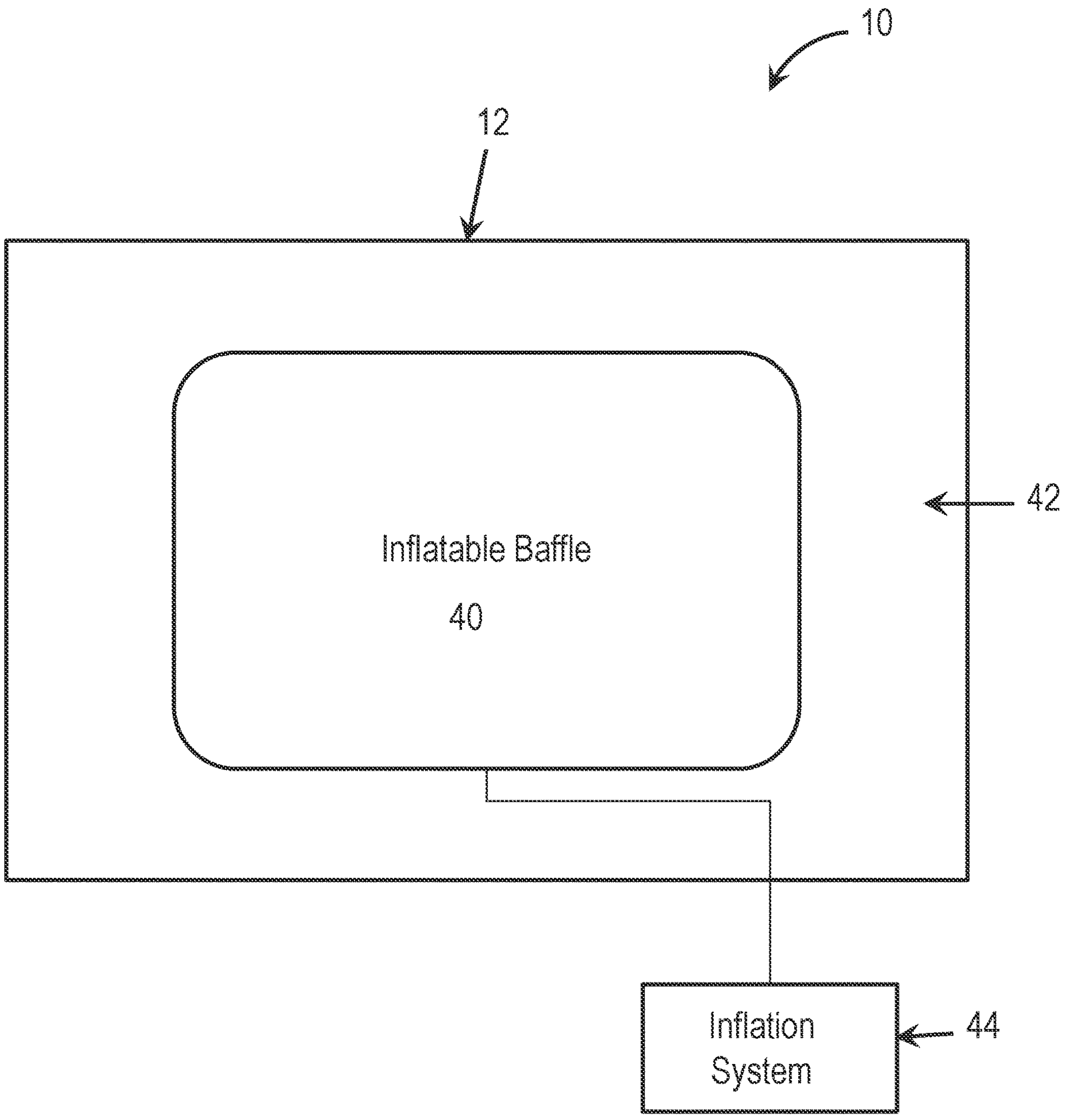
FIG. 2 is a schematic diagram of an inflatable baffle positioned in a cargo tank to displace some of the volume of the tank and thereby reduce the amount of active chemical solution used to soak the walls of the cargo tank, in accordance with an embodiment of this disclosure.

To reduce the overall amount of acid material that is used to remove impurities from the cargo tank 12, certain embodiments may use one or more chemical resistant inflatable baffles 40 or bladders installed in the void 42 of the tank 12, as shown in FIG. 2. In this approach, the bladder 40 displaces most of the empty space 42 that fills most of the tank 12. An inflation system 44 including one or more pumps and sources of a gas may be used to perform the inflation. The inflation system 44 may be controlled by a control system (e.g., as described in FIG. 5) based on desired washing parameters.

In one embodiment, a high strength acid (e.g., >5% v/v acid) is then used to fill the remaining space between the bladder 40 and the tank walls. The tank 12 is soaked for a period of time, for example hours to days. The corrosion material and impurities dissolve or flake off as intact solids into the acid solution, which is then flushed out after the soaking period. Any appropriate solution may be used for the flushing process, for example an acidic solution, water, a caustic solution, a buffer solution, or any combination.

Figure 3:
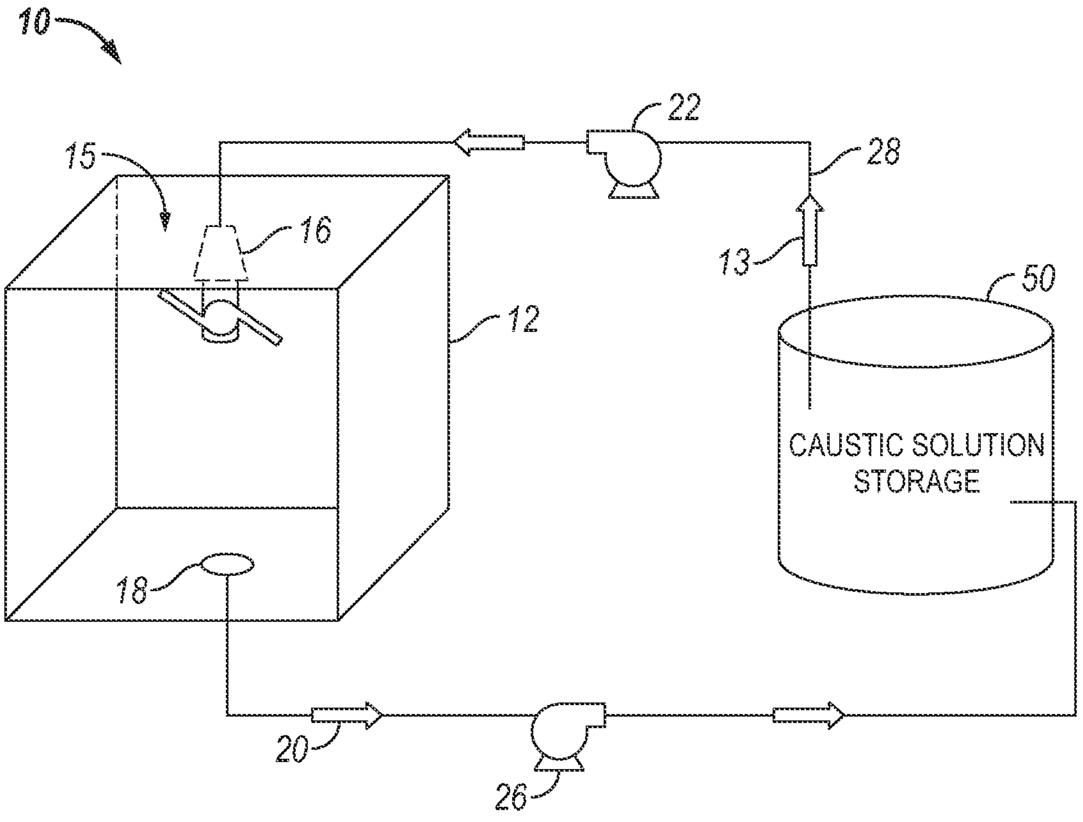
FIG. 3 is a schematic diagram of a COW tank cleaning machine repurposed to spray caustic solution around a cargo tank, in accordance with an embodiment of this disclosure.

Embodiments of the impurity removal system 10 may utilize a basic (caustic) solution (e.g., stored in caustic solution storage tank 50) in addition to or in lieu of the acidic solution, as shown in FIG. 3. That is, a caustic solution, a caustic foam, etc., may be used in any of the descriptions set forth above either in place of or in combination with an acidic solution or an acidic foam. Examples of using a combination of a caustic and an acidic solution may include first introducing the caustic solution to perform a first impurity removal, and subsequently introducing the acidic solution to perform a second impurity removal, or vice-versa.

In certain embodiments, for instance, the active chemical solution used for cleaning the tank surfaces includes a caustic solution (e.g., pH 9-14) that contains a high concentration of sulfides (e.g., >1% w/v $Na_2S$), i.e., at least one base in combination with at least one sulfide. The caustic and aqueous sulfides may dissolve all or specific components of the surface layer, examples of which include dissolution of solid iron sulfides or heavy metal sulfides present in a corrosion layer.

In certain situations, the impurities may be associated with organic petroleum deposits on the interior tank surfaces. To address this, in certain embodiments the active chemical used for cleaning the tank surfaces may include an emulsifier (e.g., a caustic solution with pH >9), a non-ionic surfactant (e.g., nonyl phenol ethoxylates), and/or a degreaser/sequestrant (e.g., sodium gluconate).

Figure 4:
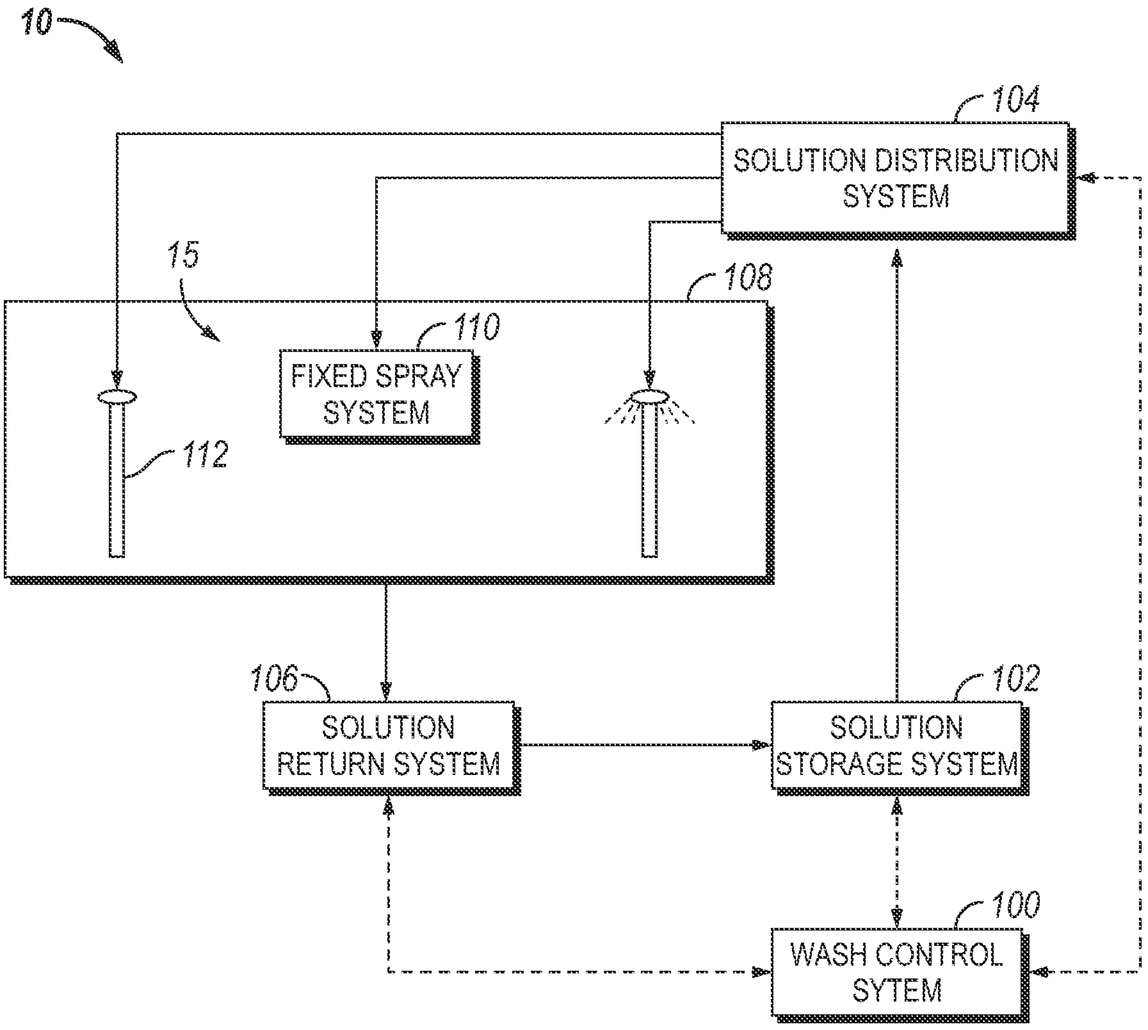
FIG. 4 is a schematic diagram of an impurity removal system that uses a combination of fixed spray apparatus and portable spray apparatus to spray cleaning solution around a vessel interior, in accordance with an embodiment of this disclosure.

FIG. 4 is a schematic diagram of an embodiment of the impurity removal system 10 having a combination of the features described above. Any one or a combination of these features may be used in an actual implementation. In the embodiment of FIG. 4, the impurity removal system 10 includes a washing control system 100 communicatively coupled to a solution storage system 102, a solution distribution system 104, and a solution return system 106. The solution storage system 102, a solution distribution system 104, and a solution return system 106 may be the COW 14, or may include features added to the existing COW 14 of a vessel 108. As described in further detail below with respect to FIG. 5, the washing control system 100 may include one or more computing systems having machine executable instructions stored on a tangible medium, along with features allowing for communication and interfacing.

In general, the solution storage system 102, the solution distribution system 104, and the solution return system 106 may include equipment used for storage, mixing, filtration, and motivation, among other processes, in the system 10. The washing control system 100 may automate all or a part of a vessel cleaning procedure via communication with these systems, or may be used to output parameters (e.g., spray apparatus heights, cleaning time, pump pressures or flow rates) to be followed by operators responsible for cleaning the vessel 108 (e.g., cargo tank 12).

The solution storage system 102 may include, for instance, chemical storage for acidic, caustic, anti-corrosive, foaming, or other solutions. As depicted, the solution storage system 102 supplies the active chemical solution 13 (or a number of active chemical solutions) to the solution distribution system 104.

The solution distribution system 104 may include, for instance, flowlines, headers for distribution of the active chemical solution 13, heaters to heat the active chemical solution 13, mixers, pumps, turbines, or any combination of devices configured to pre-treat the active chemical solution 13 and deliver it to the inlet assembly 15. In some embodiments, the solution distribution system 104 may be used to produce the active chemical solution 13 used for cleaning the vessel 108, for example by mixing different chemicals together (e g, an acid and anti-corrosion additive).

The solution distribution system 104 is configured, again, to deliver the active chemical solution 13 (the inlet solution) to the inlet assembly 15. The inlet assembly 15 as illustrated includes a fixed spray system 110, which includes fixed spray apparatus such as nozzles or jets of the vessel 108. Portable nozzles 112 of the inlet assembly 15 may be positioned and moved within the vessel 108 to provide additional coverage of the interior of the vessel 108, as described in further detail below.

The illustrated solution return system 106 represents the devices and features that are responsible for returning the effluent solution 20 to the solution storage system 102, and may include flow lines, pumps, headers, and the like, to allow for motivation, filtration, treatment, monitoring, and so forth, of the effluent solution 20. In some embodiments, the solution return system 106 may include at least one bypass line such that the effluent solution 20 may bypass the solution storage system 102 and flow directly to the solution distribution system 104. In such embodiments, the solution return system 106 may be configured to process the effluent solution 20 such that it is usable within the solution distribution system 104 as all or a part of the active chemical solution 13 delivered to the inlet assembly 15.

Figure 5:
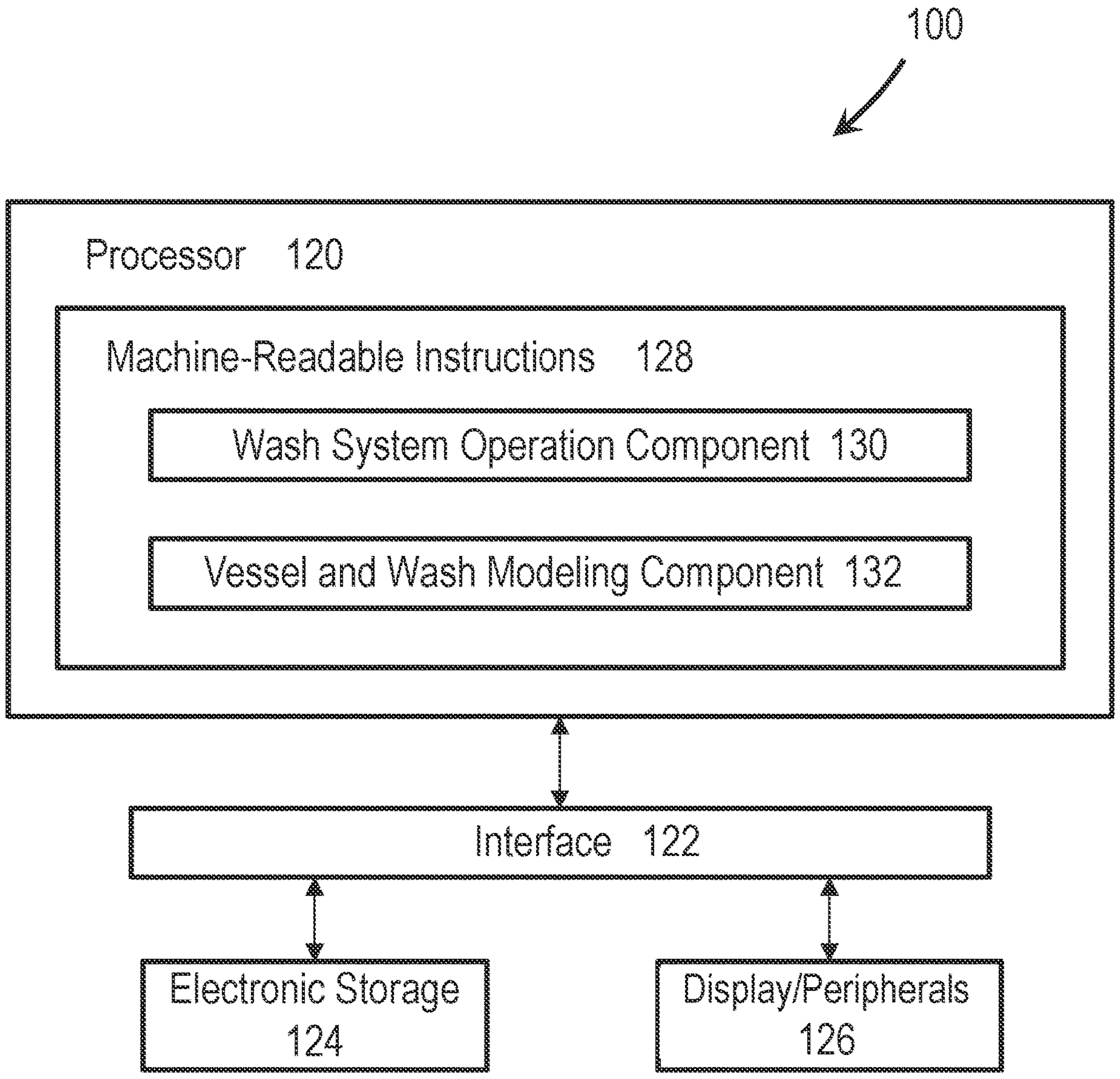
FIG. 5 is a schematic diagram of the wash control system of FIG. 4, in accordance with an embodiment of this disclosure.

The washing control system 100 may control any or all aspects of the above processes. As an example, the impurity removal system 10 may include various automated controls to maintain flow rates, pressures, acidity and/or basicity, etc., to within certain ranges. The automated controls may also stop, start, or change various operational parameters of the impurity removal system 10. FIG. 5 illustrates an example configuration of the washing control system 100, which includes one or more of a processor 120, an interface 122 (e.g., bus, wireless interface), an electronic storage 124, a display and/or other peripherals 126, and/or other components.

The processor 120 may be configured to provide information processing capabilities in the system 10. As such, the processor 120 may include one or more of a digital processor, an analog processor, a digital circuit designed to process information, a central processing unit, a graphics processing unit, a microcontroller, an analog circuit designed to process information, a state machine, and/or other mechanisms for electronically processing information. The processor 120 may be configured to execute one or more machine-readable instructions 128 to facilitate the removal of impurities from the vessel 108 (e.g., cargo tank 12). The machine-readable instructions 128 may include one or more computer program components, such as the illustrated wash system operation component 130, a vessel and wash modeling component 132, and/or other computer program components.

The wash system operation component 130 may be configured to obtain washing operation information and/or other information. Obtaining such operation information may include one or more of accessing, acquiring, analyzing, determining, examining, generating, identifying, loading, locating, measuring, opening, receiving, retrieving, reviewing, selecting, storing, and/or otherwise obtaining the washing operation information. The washing operation component 130 may obtain the washing operation information from one or more sensors, from data input, and the like. By way of non-limiting example, the washing operation component 130 may obtain washing operation information from one or more hardware components (e.g., a computing device, a sensor, a pressure sensor, a temperature sensor, a flow meter, chemical analysis devices) and/or one or more software components (e.g., software running on a computing device).

The vessel and wash modeling component 132 may be configured to output modeled characteristics of the vessel 108, modeled characteristics of the impurity removal system 10, and to model a washing result given a set of washing parameters. The vessel and wash modeling component 132 may generate, for instance, a washing result based on known positions of spray apparatus 16, the interior characteristics of the vessel 108 (e.g., internal vessel geometries and materials), the nature of the impurities to be removed, the nature of the active chemical solution 13, and so forth.

To generate such results, the vessel and wash modeling component 132 may use, as a non-limiting example, one or more machine-learning models (e.g., supervised or unsupervised). The machine-learning model(s) may perform multivariate analysis to generate, for instance, a map of the surface of the interior of the vessel 108 that is expected to achieve a desired level of impurity removal given the various vessel and impurity removal system characteristics. Examples of wash modeling results are shown in FIGS. 6 and 7.

Figure 6:
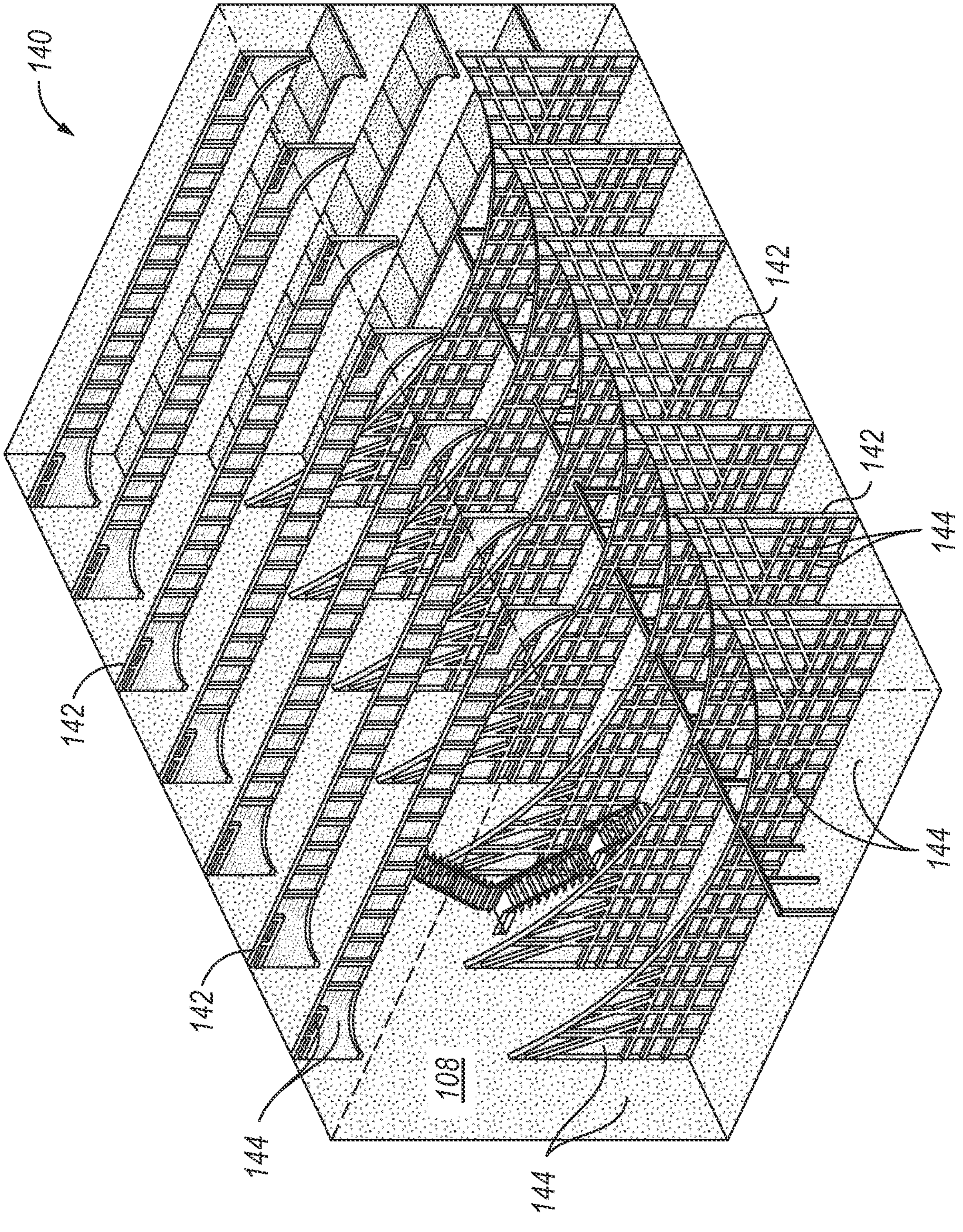
FIG. 6 is an example modeling output produced by the system of FIG. 5, in accordance with an embodiment of this disclosure.

In particular, FIG. 6 depicts a modeling output 140 of a washing result using only fixed nozzles for an example vessel 108. In this example, the vessel 108 includes interior features 142, such as supports, trusses, stairs, and the like. Because of these features, numerous areas 144 are blocked from receiving a sufficient jet of active chemical solution 13 from the fixed nozzle positions. These areas 144 may be referred to as insufficiently washed, or shadow regions.

Figure 7:
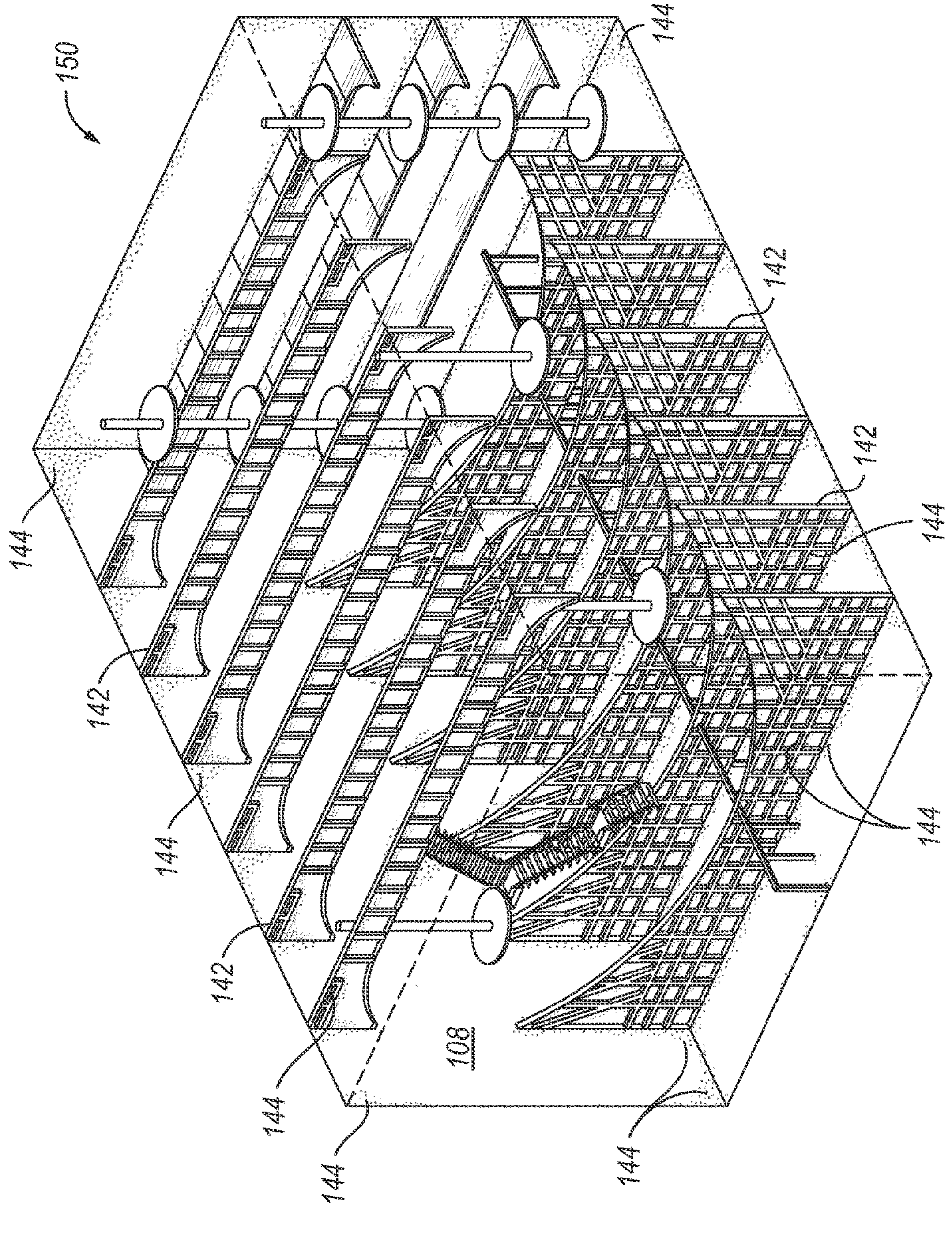
FIG. 7 is an example modeling output produced by the system of FIG. 5, in accordance with an embodiment of this disclosure.

FIG. 7 depicts a modeling output 150 of a washing result using a different set of washing parameters for the same vessel 108 shown in FIG. 6. Specifically, the modeling output 150 resulted from modeling a combination of fixed and portable nozzles along with varying the nozzle height used for jetting the active chemical solution 13. As shown, the areas 144 are significantly reduced in FIG. 7 compared to FIG. 6, which demonstrates that the washing parameters are superior. This may represent using, for example, a combination of a stationary, existing crude oil wash system and a mobile crude oil wash system that have been repurposed to spray the active chemical solution 13.

Returning to FIG. 5, in some embodiments, the wash system operation component 130 may utilize one or more outputs from the vessel and wash modeling component 132 and may generate updated operating parameters (e.g., wash procedures) based on the output. The washing control system 100 may, as a result, adjust operation of the impurity removal system 10 between washes, between washing cycles, or on-the-fly (during a wash cycle).

Although the processor 120, the electronic storage 124, and the display/peripherals 126 are shown to be connected to the interface 122, any communication medium may be used to facilitate interaction between any components of the system 100. One or more components of the system 100 may communicate with each other through hard-wired communication, wireless communication, or both. Further, although the processor 120, the electronic storage 124, and the display/peripherals 126 are shown in FIG. 1 as single entities, this is for illustrative purposes only. One or more of the components of the system 100 may be contained within a single device or across multiple devices. For instance, the processor 120 may comprise a plurality of processing units. These processing units may be physically located within the same device, or the processor 120 may represent processing functionality of a plurality of devices operating in coordination. The processor 120 may be separate from and/or be part of one or more components of the system 100. The processor 120 may be configured to execute one or more components by software; hardware; firmware; some combination of software, hardware, and/or firmware; and/or other mechanisms for configuring processing capabilities on the processor 120.

It should be appreciated that although computer program components are illustrated in FIG. 5 as being co-located within a single processing unit, one or more of computer program components may be located remotely from the other computer program components. While computer program components are described as performing or being configured to perform operations, computer program components may comprise instructions which may program processor 120 and/or system 100 to perform the operation.

While computer program components are described herein as being implemented via processor 120 through machine-readable instructions 128, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 120 may be configured to execute one or more additional computer program components that may perform some or all of the functionality attributed to one or more of computer program components described herein.

The electronic storage media of the electronic storage 124 may be provided integrally (i.e., substantially non-removable) with one or more components of the system 100 and/or as removable storage that is connectable to one or more components of the system 100 via, for example, a port (e.g., a USB port, a Firewire port, etc.) or a drive (e.g., a disk drive, etc.). The electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 124 may be a separate component within the system 100, or the electronic storage 124 may be provided integrally with one or more other components of the system 100 (e.g., the processor 120). Although the electronic storage 124 is shown in FIG. 5 as a single entity, this is for illustrative purposes only. In some implementations, the electronic storage 124 may comprise a plurality of storage units. These storage units may be physically located within the same device, or the electronic storage 124 may represent storage functionality of a plurality of devices operating in coordination.

Figure 8:
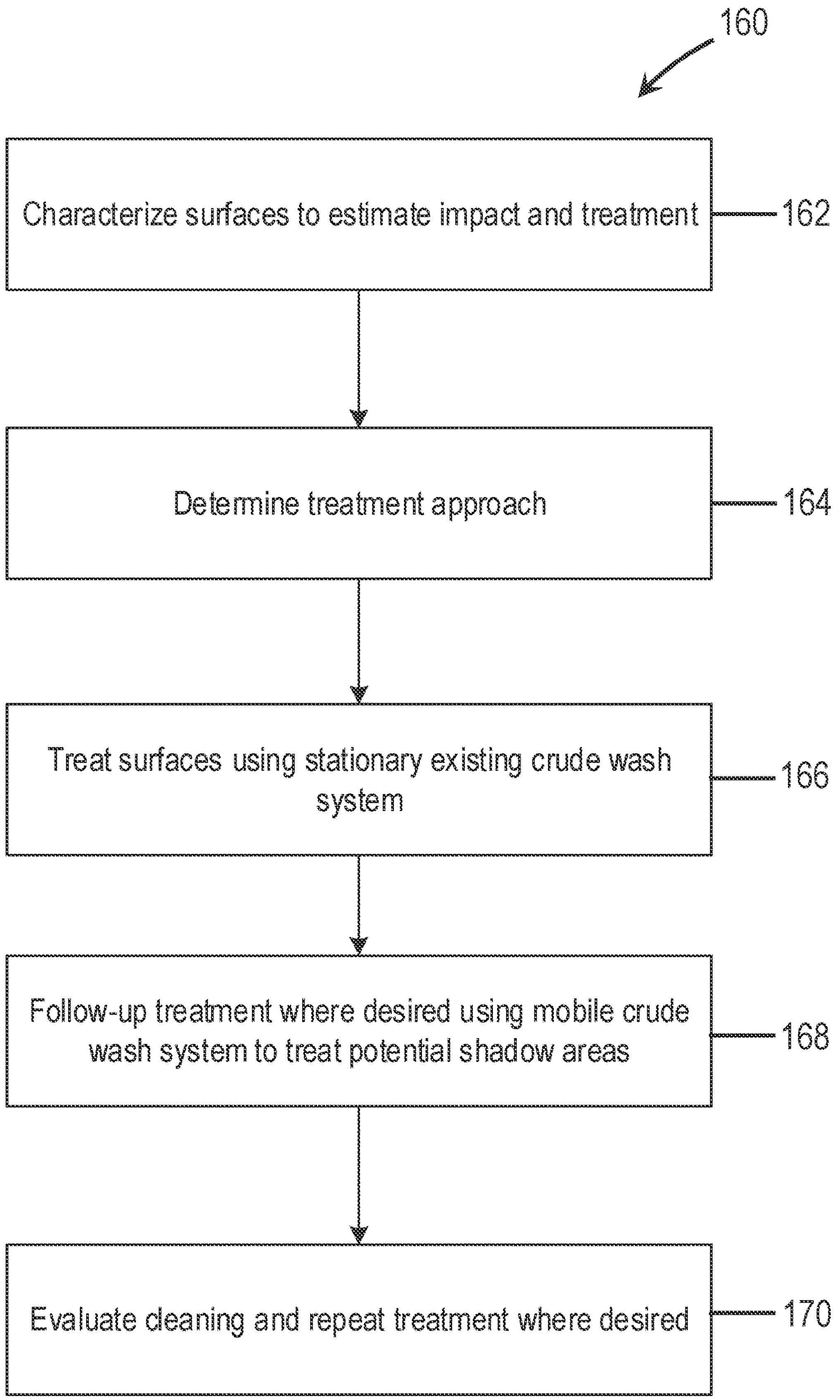
FIG. 8 is a flow diagram of a method of removing impurities from a vessel interior, in accordance with an embodiment of this disclosure.
Figure 9:
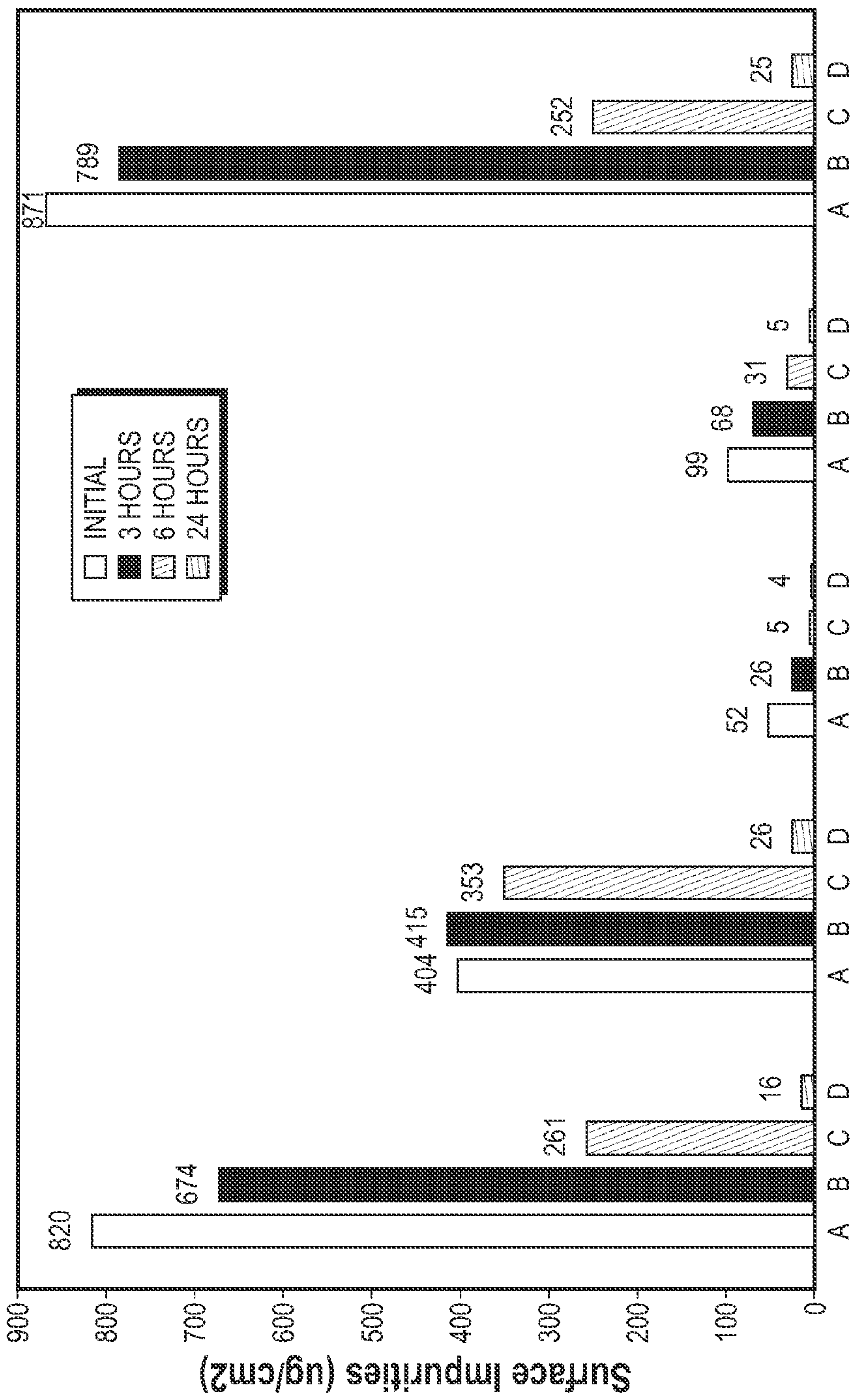
FIG. 9 is a chart demonstrating a decrease in surface impurities on carbon steel as a result of increasing contact time with 10% hydrochloric acid, in accordance with an embodiment of this disclosure.

The foregoing systems and approaches may be used to perform a number of different washing procedures that can remove impurities from vessels, such as cargo tanks that are used to move oil and gas, using existing wash systems of the vessels (e.g., such as the crude oil wash system). FIG. 8 is a flow chart of an example method 160 for removing impurities from a vessel using the systems and approaches described herein. It should be noted that some of the steps associated with method 160 may be omitted, and further in some embodiments certain of the steps may be performed in a different order in certain implementations. The method 160 may be performed by the wash control system 100 controlling the impurity removal system 10, by an operator controlling the impurity removal system 10, or a combination of both.

The method 160 includes characterizing (step 162) surfaces of the vessel to estimate the impact of impurities and corrosion on the vessel (e.g., the extent to which the surfaces are corroded and have impurities), and to subsequently estimate a need for treating/washing the vessel. If it is determined that the vessel requires treatment, the method 160 proceeds to determining (step 164) a treatment approach.

As an example, determining a treatment approach according to step 164 may include modeling the interior of the vessel to determine the extent of treatment needed for the vessel given its geometry and amount of corrosion and impurities present. Step 164 may also include modeling a given set of washing parameters to determine the extent to which the vessel is cleaned using the parameters. Additionally or alternatively, the step 164 may generate a recommended set of washing parameters (e.g., a recommended washing procedure) to be performed by the system 10 to achieve a desired level of treatment.

The method 160 includes treating (step 166) the surfaces (e.g., interior surfaces) of the vessel using the stationary, existing crude wash system as described above for example with respect to FIGS. 1-4. Where desired or prescribed by step 164, the method 160 may also include treating (step 168) the interior of the vessel using a mobile crude oil wash system to treat potential shadow areas as described above with respect to FIGS. 6 and 7. This may be a follow-up or concurrent treatment to step 166. In embodiments where it is a follow-up treatment, additional modeling may be performed to further refine the treatment according to step 166.

At step 170, the method includes evaluating the cleaning and repeating treatment where desired. For example, any one or a combination of steps 164, 166, or 168 may be performed.

EXAMPLES

The following illustrative examples are intended to be non-limiting. Example 3 is an example procedure for treating a cargo tank that previously carried petroleum products and has corrosion and associated impurities.

Example 1

The effectiveness of 10% hydrochloric acid in contact with carbon steel material with surface impurities is demonstrated in the chart of FIG. 7. In particular, a carbon steel test coupon with surface impurities was placed in contact with a 10% (v/v) hydrochloric acid solution. Each of the sets of bars represents a different test run with a different carbon steel coupon. As illustrated in the chart, a decrease in the surface impurities was generally observed with an increase in contact time (ranging from 3 hours to 24 hours) with the acid solution.

Example 2

The effectiveness of a 1% hydrochloric acid soak on carbon steel material with surface impurities is demonstrated in Table 1 below. In particular, a carbon steel test coupon with surface impurities was soaked in a 1% (v/v) hydrochloric acid solution. Each of the rows represents a different test run with a different carbon steel coupon. As the table shows, for each of the test runs, a significant decrease in the surface impurity was observed after one week of soak time. The level of impurity generally stayed much lower than the initial level, as demonstrated by the 2 week and 4 week data.

TABLE 1

Decrease in surface impurities on carbon steel as a result of increasing soak time with 1% hydrochloric acid

| Initial (ug/cm2) | 1 week (ug/cm2) | 2 weeks (ug/cm2) | 4 weeks (ug/cm2) |
|---|---|---|---|
| 1219 | 25.6 | 40.7 | 22.7 |
| 2746.8 | 56.8 | 156.9 | 66.8 |
| 79.3 | 8 | 2.3 | 2.3 |
| 2860.3 | 102.3 | 65.8 | 51 |
| 75.8 | 0 | 1.6 | 2.4 |
| 123.8 | 6.9 | 10.7 | 5 |
| 109.4 | 1.4 | 1.9 | 1.2 |
| 131.4 | 1.9 | 2.6 | 2.7 |
| 453.2 | 29.4 | 37.3 | 27.9 |
| 975.8 | 7.9 | 14.5 | 10.1 |

Example 3—Example Treatment Procedure

In an example procedure, various processes are performed at sea and other after the vessel has reached the shipyard. In a first set of tasks performed at sea, the parcel is offloaded and the tanks are purged with inert gas. The pressure of the tanks are reduced to install portable cleaning equipment. Slop tanks are washed with seawater or produced water to remove residual hydrocarbons.

Once the vessel has arrived at the shipyard, the washing equipment is tested and connected to ensure proper operation (e.g., proper flow, power supply, and draining). The tanks are cleaned with hot water and degreasing chemicals if residual hydrocarbons are present. High pressure water removes any residual liquids/sludge/sand in a demucking process from all tanks. The slop tanks are filled with fresh water for the acid wash and for rinsing and topping off.

Once the system is ready, the acidic solution is prepared using hydrochloric and sulfuric acid, which are mixed with an appropriate corrosion inhibitor in one of the slop tanks. The portable tank cleaning machines are rigged to prevent a drop in inert gas pressure during cleaning. The fixed cleaning equipment is used for 2 full cycles (e.g., four hours per cycle), and the portable cleaning equipment is used for two full cycles (e.g., two hours per cycle) at each prescribed nozzle height.

A stripping pump and an eductor continuously strip the cargo tank and transfer the contents (effluent) to the slop tank having the acidic solution. Once the cargo tank acid wash is completed, the equipment is drained and flushed with fresh water. The cargo tank is then stripped of water using pumps, eductors, and if needed, submersible pump and tote tanks.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed:

1. A process to remove impurities from a surface of a cargo tank of a vessel used to store and transport liquid hydrocarbons, the process comprising:
   - installing one or more chemical resistant inflatable baffles in a void of the cargo tank and inflating the one or more baffles to displace a majority of an empty space of the cargo tank;
   - filling a remaining space between the one or more baffles and the surface of the cargo tank with an active chemical solution;
   - contacting the active chemical solution with the surface to dissolve at least a portion of the impurities or a matrix in which they are embedded or deposited on the surface of the cargo tank; and
   - allowing the active chemical solution to subsequently remove embedded impurities from the surface.

2. The process of claim 1, wherein the active chemical solution comprises an acidic solution.

3. The process of claim 1, wherein the active chemical solution comprises an acidic foam.

4. The process of claim 1, wherein the active chemical solution comprises hydrochloric acid, sulfuric acid, nitric acid, phosphoric acid, hydrofluoric acid, ammonium bifluoric acid, an organic acid, or any combination thereof.

5. The process of claim 1, wherein contacting the active chemical solution to dissolve at least the portion of the impurities or the matrix in which they are embedded deposited on the surface of the cargo tank comprises jetting an acidic solution having at least 5% by volume acid against the surface of the cargo tank.

6. The process of claim 1, wherein contacting the active chemical solution to dissolve at least the portion of the impurities or the matrix in which they are embedded or deposited on the surface of the cargo tank comprises soaking an acidic solution having less than 5% by volume acid in the cargo tank for a soaking period.

7. The process of claim 1, wherein the active chemical solution comprises a caustic solution.

8. The process of claim 1, wherein the active chemical solution comprises a caustic foam.

9. The process of claim 1, wherein the active chemical solution comprises a base and a sulfide.

10. The process of claim 1, wherein the active chemical solution comprises an emulsifier, a non-ionic surfactant, a degreaser/sequestrant, a corrosion inhibitor, or any combination thereof.

11. The process of claim 1, comprising using a crude oil wash (COW) system to introduce the active chemical solution into the cargo tank.

12. The process of claim 1, wherein the vessel is a nautical vessel.

13. The process of claim 1, wherein the vessel is an offshore vessel.

14. The process of claim 1, wherein the vessel is an onshore vessel.

* * * * *